May 5, 1970
3,510,195
IMMERSED FIBER OPTICS STRUCTURE
Filed June 30, 1966
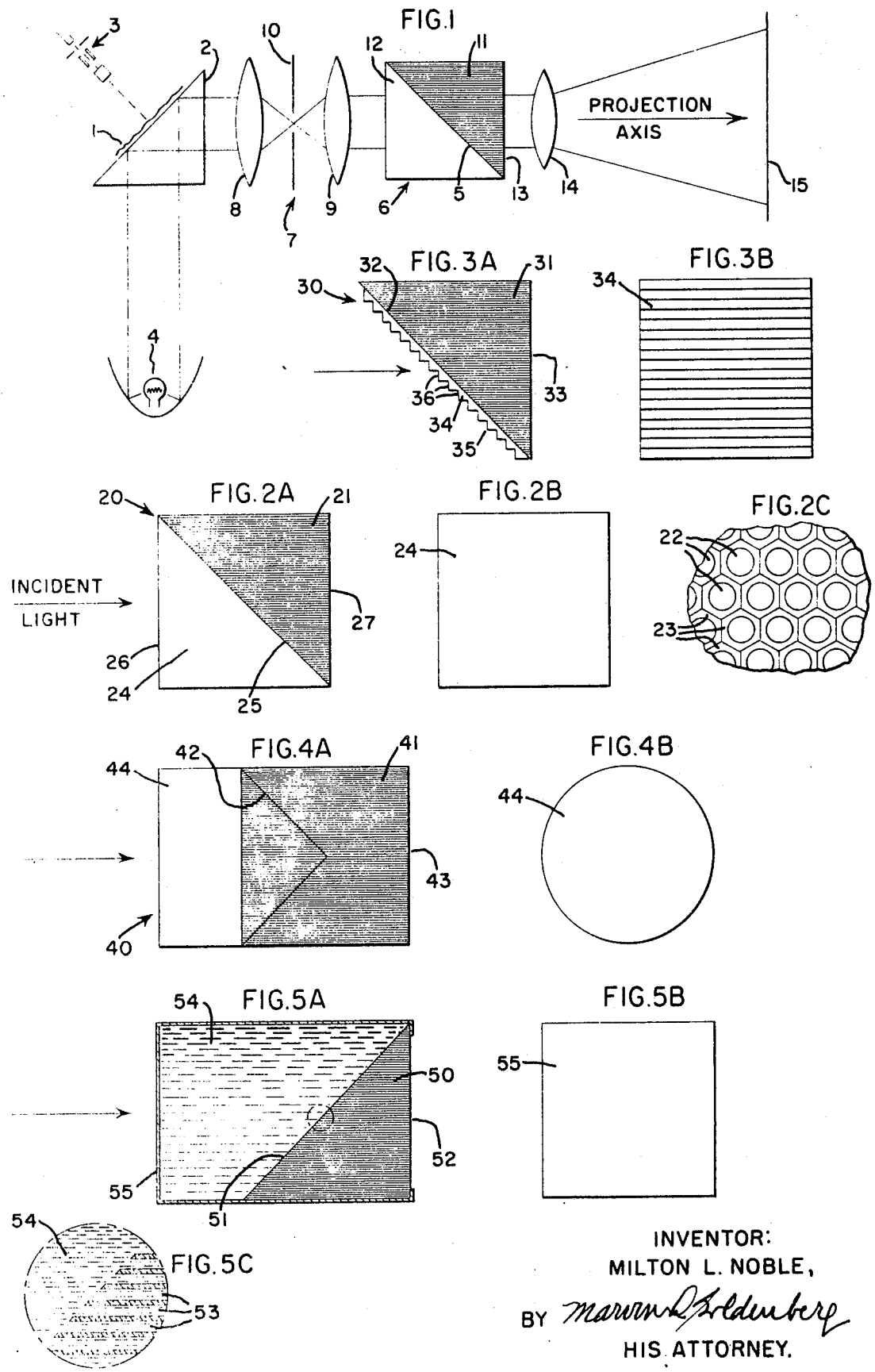
INVENTOR:
MILTON L. NOBLE,
BY Marvin Goldenberg
HIS ATTORNEY.

United States Patent Office 3,510,195
Patented May 5, 1970

3,510,195
IMMERSED FIBER OPTICS STRUCTURE
Milton L. Noble, Liverpool, N.Y., assignor to General
Electric Company, a corporation of New York
Filed June 30, 1966, Ser. No. 561,863
Int. Cl. G02b 5/16, 5/04, 5/06
U.S. Cl. 350—96                                3 Claims

ABSTRACT OF THE DISCLOSURE

An immersed fiber optics structure having an input face oblique with respect to incident light energy, the fiber core and adjoining immersing substance being a transparent fluid composition of matching index of refraction so as to substantially reduce diffraction and reflection at said input face.

The invention relates to a fiber optics structure of the type wherein the input face of the structure's fiber bundle is skewed and obliquely disposed with respect to incident light. More specifically the invention relates to a novel fiber optics structure wherein means are provided in combination with said fiber bundle for substantially reducing reflective and diffractive effects upon incident light at said skewed input face.

In light projection systems of the reflection type, the plane of the object to be projected, for various reasons, is often required to be "off axis," i.e., obliquely arranged with respect to the axis of the projected light. For such systems, a sophisticated projection optics is required for projecting the object in a manner essentially free of distortion. An optical design has been recently developed for simply and effectively providing projection of "off axis" objects which employs a telecentric transfer lens and a skewed optical fiber bundle. Briefly, the object is imaged by means of the telecentric transfer lens upon a fiber bundle having an input face that is of symmetrical obliquity with respect to the object plane and an output face that is "on axis," or normal to the projection axis. The fiber bundle rotates the image so that the image plane is orthogonal to the projection axis, and projection can be readily accomplished from the output face with the elimination of "off axis" distortion. However, because the fiber bundle input face must be oblique with respect to the projection axis, the system is susceptible to appreciable reflection and diffraction of light incident at said input face. An important further requirement of the system, therefore, is that these reflective and diffractive effects be substantially avoided. The present invention is intended to effectively accomplish this.

Accordingly, it is an object of the invention to provide a novel fiber optics structure that can be readily employed in a projection system for projecting "off axis" objects, and the like, which does not introduce distortions in the projected image.

It is another object of the invention to provide a novel fiber optics structure wherein the fiber bundle of the structure has an input face that is obliquely disposed with respect to incident light, and reflective and diffractive effects upon said incident light are substantially avoided.

It is a further object of the invention to provide a novel fiber optics structure in combination with a telecentric transfer lens for use in a projection system as above described, which structure can be readily matched within the transfer lens system.

It is still a further object of the invention to provide a novel method of fabricating a fiber optics structure of the above described type.

These and other objects are accomplished in accordance with one aspect of the invention by bonding to the skewed input face of the fiber bundle an immersing glass member having an index of refraction matched to that of the core material of the fiber bundle. The glass member is constructed so as to have a single planar input surface that is normal to the direction of incident light.

In accordance with a second aspect of the invention the immersing glass member is a plate, the input surface of which has a stepped configuration so as to present many small surface elements that are normal to direction of incident light energy.

In accordance with a further aspect of the invention the core and immersing member are composed of a fluid substance. In fabrication, the originally formed solid core material of the fiber bundle is etched away so as to leave only the cladding. A transparent fluid, typically a hydrocarbon or an oil, having an index of refraction that is greater than that of the cladding, is employed to fill the formed cavities and also a chamber provided adjacent to the input face of the fiber bundle. The fluid filled chamber may couple directly to an adjacent lens in the projection system.

The specification concludes with claims particularly pointing out and distinctly claiming the subject matter which is regarded as the invention. It is believed, however, that both as to its organization and method of operation, together with further objects and advantages thereof, the invention may be best understood from the following description taken in connection with the accompanying drawings in which:

FIG. 1 is a schematic diagram of an internal reflection type light projection system which employs a fiber optics structure of the present invention;

FIG. 2A is a side view of a first right angle prism embodiment of a solid fiber optics structure in accordance with the invention;

FIG. 2B is an end view of said first embodiment taken from the input;

FIG. 2C shows a partial, highly magnified end view of the optical fibers of said first embodiment;

FIG. 3A is a side view of a second right angle prism embodiment of a solid fiber optics structure wherein the immersing member is a serrated glass plate;

FIG. 3B is an end view of said second embodiment taken from the input;

FIG. 4A is a side view of a third embodiment of a solid fiber optics structure wherein the prism input face is of conical configuration;

FIG. 4B is an end view of said third embodiment taken from the input;

FIG. 5A is a side view of a partially liquid fiber optics structure in accordance with the invention;

FIG. 5B is an end view taken from the input of said partially liquid fiber optics structure; and FIG. 5C is a magnified sectional view of a portion of FIG. 5A.

With reference to FIG. 1, there is schematically illustrated an internal reflection projection system wherein an object plane 1 is at an oblique angle with respect to the projection axis. In the particular system illustrated, the object is the deformable surface of a deformable medium, e.g., an oil film, deformed in accordance with an applied information. The deformable medium is formed upon the oblique surface of a glass prism member 2. Information is typically applied in a well known manner by a modulated electrostatic charge beamed from an electron gun structure 3. The deformed surface is employed to modulate the projected light by means of an internal reflection process. Light from a light source 4 is projected toward the object plane 1 so as to be incident at the undeformed surface segments at about the critical angle. Total internal reflection occurs for light incident at deformed surface segments. Thus, light is selectively internally reflected from the object plane as a function of the surface deformations. A more complete discussion of an internal reflection projection system of this type is given in applicants's copending application for U.S. Letters Patent, Ser. No. 222,844, filed Sept. 11, 1962, now Pat. No. 3,357,299.

The light reflected from the object plane 1 is focused upon a corresponding oblique face 5 of a fiber optics structure 6 as an inverted planar image by means of a conventional holosymmetric telecentric transfer lens system. The overall holosymmetric transfer lens system includes all components existing between the object plane 1 and the image plane surface 5. The telecentric lens structure 7, by itself, is schematically illustrated as including a pair of transfer lenses 8 and 9 and an intermediately positioned spatial filtering mask 10. The fiber optics structure 6 includes a fiber bundle 11 and a glass member 12 that is bonded to the oblique input face 5 of the fiber bundle. The fiber bundle 11 transforms the image at the input face 5 into a planar image at its output face 13 that is orthogonal to the projection axis. In effect, the fiber bundle 11 acts to rotate the oblique image at the input face 5 so that it is normal to the projection axis and can be projected, as by a projection lens 14, without distortion onto a screen 15. As will be explained in detail, the glass member 12 substantially reduces reflective and diffractive effects upon light incident at the oblique input face 5.

In FIGS. 2A and 2B there is shown in a side and end view, respectively, one embodiment of a fiber optics structure 20 which is similar to the structure 6 and is employed where the object is formed on a single oblique plane, as illustrated in FIG. 1. The structure 20 includes a fiber bundle 21 in the shape of a right angle prism, the base surfaces of which are typically one inch square. The fiber bundle 21 is composed of a great number of optical fibers bonded together in a conventional manner. Each fiber includes a core element 22 surrounded by a cladding element 23, as shown in the greatly magnified end view of several fibers presented in FIG. 2C. In actual size, the overall fiber diameter may be about 15 microns and the core diameter about 10 microns, these dimensions being typical.

Two different glass compositions are employed for the core and the cladding, the absolute index of refraction of the core material, $n_{co}$, being greater than the absolute index of refraction of the cladding material, $n_{cl}$. For example, $n_{co}$ may be about 1.6 and $n_{cl}$ may be about 1.5. The relative index of refraction $n_{co}/n_{cl}$ being greater than 1, a critical angle is established for light entering the core elements. Accordingly, light is propagated through the fibers as successive internal reflections occur at the boundary between the core and the cladding. For a utilization of the prism as illustrated in the system of FIG. 1, the incident light is along the projection axis and is essentially parallel to the direction of the fibers of the fiber bundle 21.

An immersing glass prism 24, having an index of refraction matched to that of the core material, is bonded to the fiber bundle input face 25 so as to provide an essentially light continuous interface between the glass member 24 and the core elements 22. The glass prism 24 has an input surface 26 which is orthogonal to the incident light so that the light passes through surface 26 with very little reflection or diffraction. Further, an antireflection film on the input surface 26 can reduce reflection to a fraction of one percent. Since a matched index of refraction is established between the glass member 24 and the core elements 22, there will be also very little reflection or diffraction occuring at the fiber bundle input face 25. The output face 27 of the fiber bundle 21, like surface 26, is also orthogonal to the projected light.

Where desirable the optical characteristics at the input face 25 can be further improved by the employment of an optical cement of a matching index of refraction to bond the glass prism to the fiber bundle. It is noted, however, that for many applications the optical properties of the interface between the glass prism 24 and the fiber bundle 21 need not be optimized. Thus, a small degree of optical mismatch may be tolerable and normally will not be detected in viewing the projected image.

As a further consideration, when the fiber optics structure 30 is employed in a telecentric transfer lens system, it is important that the glass member 24 have matching optical properties with the glass piece associated with and which immerses the object, so that the system retains its holosymmetrical characteristics. Thus, when employed in a projection system as in FIG. 1, the glass prism 24 should have similar optical properties, i.e., dimensions, refractive index, etc., as the object supporting prism 2 so that comparable and corresponding light paths exist for either half of the telecentric lens system.

Illustrated in FIGS. 3A and 3B is a second embodiment of the invention. The fiber optics structure 30 includes a fiber bundle 31 in the shape of a right angle glass prism having an oblique input face 32 and a normal output face 33. The immersing member is in the form of a glass plate 34 that is bonded to the oblique fiber bundle face 32 and which itself has a serrated input face 35. The serrations are in the form of square steps so that the face 35 provides numerous surface elements 36 that are orthogonally oriented with respect to incident light. As with respect to the previously described embodiment, the glass plate 34 has an index of refraction that is matched to that of the core elements of the fiber bundle 31. The thickness of the glass plate is a function of the number of serrations. Typically there may be provided one hundred serrations per inch, and a plate thickness of several hundredths of an inch.

The structure of FIGS. 3A and 3B requires less bulk of the immersing member than the embodiment of FIGS. 2A and 2B. In addition, it may be employed to advantage in an external reflection projection system having a telecentric transfer lens, wherein the object is supported by a thin glass reflecting member and is only slightly immersed, or where the object is not at all immersed. In such systems the requirement for providing an optical match within the holosymmetric telecentric lens system can be readily satisfied.

In FIGS. 4A and 4B there is illustrated a third embodiment of a fiber optics structure 40 which includes a fiber bundle 41 that is in the form of a solid cylinder having a coaxial conical cutout portion. Thus, the input face 42 of the fiber bundle 41 is a conical configuration and the output face 43 is a circular plane. In operation, the conical image formed on the input face 42 is effectively rotated by the fibers into a circular planar image at the output face 43. A glass member 44, in the form of a solid cylinder having its rear end surface shaped as a right circular cone of precisely the same solid angle as the conical cutout portion, is bonded to the fiber bundle 41 at its input face 42. As described with respect to the previous embodiments, the index of refraction of the glass member 44 is matched to that of the core elements of fiber bundle 41. Thus, an interface is formed at the input face 42 which substantially reduces reflection and diffraction of light energy incident thereat.

The fiber optics structure 40 is employed in a projection system wherein it may be required to transform a conical image into a circular plane image. One such application is with respect to a PPI projection system as described in applicant's copending application for U.S. Letters Patent Ser. No. 561,912 filed June 30, 1966, now Pat. No. 3,347,133, which is a continuation-in-part of application for U.S. Letters Patent Ser. No. 503,343, filed Oct. 23, 1965, now abandoned.

A further embodiment of the invention is illustrated in FIGS. 5A and 5B. There is included a fiber bundle 50 having a planar input face 51 that is at an oblique angle with respect to the direction of incident light, and an output face 52 that is orthogonal with respect to said light direction. In the fiber bundle 50 the core elements 53 are of a fluid composition, as shown in the magnified sectional view of FIG. 5C. In addition, the same fluid substance 54 borders the input surface, and in the embodiment illustrated fills a chamber 55. The chamber 55 may be employed to extend between an adjacent lens element and the fiber bundle 50.

The fiber bundle 50 is fabricated by first forming a solid fiber bundle such as shown in the previous figures of the drawing. The core elements are then selectively etched away by immersing the fiber bundle into an etching solution. For the described construction, it is necessary that the fiber bundle be originally formed of core and cladding materials which permit the core to be selectively etched away from the cladding, leaving the cladding completely intact. A fluid, such as a hydrocarbon or an oil, having good optically transmissive properties and an index of refraction that is greater than that of the cladding, as previously described, fills the cavities formed by the etch process and also occupies the chamber 5. A typical fluid that may be employed is naphthalene or benzene. The etched original core material may be typically barium crown or flint glasses and the cladding fluor crown or boro silicate crown glasses. A variety of suitable etch solutions may be employed.

For the purpose of clear and complete disclosure, a limited number of specific embodiments have been described. It may be appreciated that additional embodiments and modifications which fall within the basic teachings presented may readily occur to ones skilled in the art. In this context, although the fiber bundles of the described structures are illustrated as having only planar and conical input surface configurations, it should be appreciated that these input faces may assume many different irregular and nonplanar configurations, as may be required for matching the surface configuration of a given "off axis" object.

What I claim as new and desire to secure by Letters Patent of the United States is:

1. An immersed fiber optics structure comprising:
   (a) a bundle of optical fibers, each fiber being composed of a core substance of transparent fluid composition having a first index of refraction surrounded by a cladding substance of a second index of refraction, the relative index of refraction of the core substance to the cladding substance being greater than unity so that light energy intercepted by said fiber bundle may be propagated along said fibers by means of internal reflection phenomena,
   (b) the fiber bundle being constructed with at least a portion of its input face skewed with respect to said optical fibers and thereby forming an oblique angle with incident light energy,
   (c) an immersing substance of transparent fluid composition adjoining said input face and forming a continuous light propagating medium with said core, said immersing substance having an index of refraction matched to that of the core substance so as to substantially reduce diffraction and reflection of said incident light energy at said input face.

2. An immersed fiber optics structure as in claim 1 wherein the cladding of said fiber bundle is a transparent glass composition forming cavities that are filled with said fluid, said structure including an enclosed chamber adjacent said input face that is also filled with said fluid.

3. An immersed fiber optics structure as in claim 2 wherein said fiber bundle is a right angle prism the fibers of which run parallel to one of the prism base surfaces, the other prism base surface forming the structure's output face and the prism oblique surface forming said input face.

References Cited
UNITED STATES PATENTS

| | | | |
|---|---|---|---|
| 3,030,852 | 4/1962 | Courtney-Pratt | 350—96 |
| 3,177,759 | 4/1965 | Wilks | 350—286 |
| 3,278,738 | 10/1966 | Clark | 350—96 X |
| 3,332,757 | 7/1967 | Hawkins | 350—96 X |
| 3,389,950 | 6/1968 | Harper | 350—96 |

JOHN K. CORBIN, Primary Examiner

U.S. Cl. X.R.

350—179, 286